United States Patent [19]

Joy, III

[11] 4,323,542

[45] Apr. 6, 1982

[54] CATALYTIC CONVERSION OF CARBON MONOXIDE, HYDROCARBONS AND OXIDES OF NITROGEN

[75] Inventor: George C. Joy, III, Alrington Heights, Ill.

[73] Assignee: UOP Inc., Des Plaines, Ill.

[21] Appl. No.: 176,831

[22] Filed: Aug. 8, 1980

Related U.S. Application Data

[63] Continuation-in-part of Ser. No. 52,647, Jun. 27, 1979, abandoned.

[51] Int. Cl.$^3$ .............................................. B01D 53/36
[52] U.S. Cl. .................. 423/213.5; 423/239; 423/245; 423/247; 252/466 PT
[58] Field of Search ..................... 423/213.5, 239, 247, 423/245 S; 252/466 PT

[56] References Cited

U.S. PATENT DOCUMENTS

| | | | |
|---|---|---|---|
| 2,620,314 | 12/1952 | Hoekstra | 252/448 |
| 3,140,148 | 7/1964 | Hofer et al. | 23/2 |
| 3,767,453 | 10/1973 | Hoekstra | 117/46 CA |
| 3,785,998 | 1/1974 | Hoekstra | 252/477 |
| 4,053,556 | 10/1977 | Acres | 423/239 |
| 4,153,579 | 5/1979 | Summers et al. | 252/462 |
| 4,171,287 | 10/1979 | Keith | 252/462 |

FOREIGN PATENT DOCUMENTS 1405405  9/1975  United Kingdom .

*Primary Examiner*—Earl C. Thomas
*Attorney, Agent, or Firm*—James R. Hoatson, Jr.; Gregory J. Mancuso; William H. Page, II

[57] ABSTRACT

A process for the continuous and simultaneous conversion of carbon monoxide, hydrocarbons and nitrogen oxides contained in hot gases, and in particular from hot exhaust gases from an internal combustion engine, is disclosed. The hot gases are passed in contact with a catalystic composite comprising uranium, rhodium, and platinum and/or palladium dispersed on a porous alumina surface.

8 Claims, No Drawings

CATALYTIC CONVERSION OF CARBON MONOXIDE, HYDROCARBONS AND OXIDES OF NITROGEN

CROSS REFERENCE TO RELATED APPLICATION

This application is a continuation-in-part of my co-pending application U.S. Ser. No. 52,647, filed on June 27, 1979 and now abandoned, the teachings of which are incorporated herein by reference.

BACKGROUND OF THE INVENTION

1. Field of the Invention

The invention relates to processes for the continuous and simultaneous conversion of carbon monoxide, hydrocarbons, and nitrogen oxides contained in hot gases, and in particular in hot exhaust gases, from an internal combustion engine.

2. Description of the Prior Art

Gaseous waste products resulting from the burning or combustion of hydrocarbonaceous fuels, such as gasoline and fuel oils, comprise carbon monoxide, hydrocarbons and nitrogen oxides as products of combustion or incomplete combustion, and pose a serious health problem with respect to pollution of the atmosphere. While exhaust gases from other carbonaceous fuel-burning sources, such as stationary engines, industrial furnaces, etc., contribute substantially to air pollution, the exhaust gases from automotive engines are a principal source of pollution. In recent years, with the ever-growing number of automobiles powered by internal combustion engines, the discharge of waste products therefrom has been of increasing concern, particularly in urban areas where the problem is more acute, and the control thereof has become exceedingly important. Of the various methods which have been proposed for converting the carbon monoxide, hydrocarbon and nitrogen oxide pollutants to innocuous products, the incorporation of a catalytic converter in the exhaust system holds the most promise of meeting the increasingly rigid standards established by the responsible governmental agencies.

In order to achieve a substantially simultaneous conversion of the carbon monoxide, hydrocarbon and nitrogen oxide pollutants, it has become the practice to employ a catalyst in conjunction with a fuel-air ratio control means which functions in response to a feedback signal from an oxygen sensor in the engine exhaust gases. The fuel-air ratio control means is typically programmed to provide fuel and air to the engine in a ratio conducive to a near stoichiometric balance of oxidants and reductants in the hot exhaust gases at engine cruising conditions, and to a stoichiometric excess of reductants at engine idling and acceleration conditions. The result is that the composition of the gas with which the catalyst is contacted fluctuates almost constantly, such that conditions to which the catalyst is exposed are alternatively net reducing and net oxidizing. A catalyst for the oxidation of carbon monoxide and hydrocarbons and the reduction of oxides of nitrogen must be capable of operating in such a dynamic environment.

The class of exhaust gas conversion catalysts herein contemplated, commonly referred to as three component control catalysts, must therefore function under variable conditions. Ideally, the catalyst should be capable of functioning under dynamic net oxidizing-net reducing conditions to catalyze the reaction of said pollutants with each other and/or any of the oxygen, hydrogen, carbon dioxide or water components which occur in hot exhaust gases fluctuating between a molar excess of oxidants and a molar excess of reductants. In particular, the catalyst should be capable of functioning during those more extended periods of fuel-rich operation, such as are encountered at engine idling and acceleration conditions, when the deficiency of oxidants in the exhaust gas becomes more acute. In other words, the catalyst should be capable of effecting the conversion of the otherwise oxidizable carbon monoxide and hydrocarbon pollutants in the absence of sufficient oxidants, such as oxygen and nitric oxide.

Catalytic composites comprising rhodium and platinum and/or palladium as the catalytic components have heretofore been proposed for the catalytic conversion of exhaust gases from an internal combustion engine. Frequently, the catalytic composite will further comprise a base metal component, typically nickel. While certain of the base metals are known to catalyze one or more of the various reactions which constitute the exhaust gas conversion process, they are in themselves substantially less effective, and in some cases ineffective, at the dynamic net oxidizing-net reducing conditions herein contemplated. Also, certain base metals demonstrate sharply decreased performance in the presence of sulfur. Other base metal components, although catalytically inert, are included in the catalytic composite for their contribution to physical and/or thermal stability (see U.S. Pat. Nos. 4,053,556; 3,140,148; 4,153,579; 4,171,287; and U.K. Pat. No. 1,405,405).

SUMMARY OF THE INVENTION

It has now been discovered that uranium, while substantially inactive in itself, is a uniquely effective promoter for the rhodium and platinum and/or palladium catalytic combination to provide improved and continuous three-component control at the more dynamic net oxidizing-net reducing conditions, and at fuel-rich operating conditions. Uranium, in combination with platinum and rhodium, demonstrates superior performance to other promoters at conditions of high sulfur concentration.

It is an object of this invention to present a novel process for the simultaneous conversion of carbon monoxide, hydrocarbons and oxides of nitrogen contained in hot gases, and especially in hot exhaust gases, from an internal combustion engine. It is a further object to present a novel process for the simultaneous conversion of said carbon monoxide, hydrocarbons and oxides of nitrogen utilizing a catalytic composite quickly responsive to the more dynamic net oxidizing-net reducing conditions. It is a still further object to present a novel process for the simultaneous conversion of said carbon monoxide, hydrocarbons and oxides of nitrogen utilizing a catalytic composite affording improved conversion of said carbon monoxide and hydrocarbons at fuel-rich operating conditions.

In one of its broad aspects, the present invention embodies a process for the oxidation of carbon monoxide and hydrocarbons and reduction of the oxides of nitrogen contained in hot gases, which process comprises contacting said hot gases with a catalytic composite comprising rhodium, uranium, and a metal selected from the group consisting of platinum and palladium, dispersed on a high surface area refractory inorganic oxide.

Another more specific embodiment is in a process which comprises contacting said hot gases with a catalytic composite comprising rhodium, uranium, and platinum dispersed on a high surface area alumina.

One of the more specific embodiments relates to a process for the simultaneous conversion of carbon monoxide, hydrocarbons and oxides of nitrogen contained in hot automobile exhaust gases from an internal combustion engine which comprises contacting said exhaust gases with a catalytic composite comprising from about 0.005 to about 0.15 wt.% rhodium, from about 0.1 to about 0.6 wt.% platinum, and from about 0.05 to about 3 wt.% uranium dispersed on a high surface area alumina deposited as a film on a relatively low surface area honeycomb-type ceramic support.

Other objects and embodiments of this invention will become apparent in the following detailed specification.

DESCRIPTION OF THE INVENTION

The catalytic composite of the method of this invention comprises rhodium, platinum or palladium, and uranium dispersed on a high surface area refractory inorganic oxide.

The refractory inorganic oxide should be relatively refractory to the conditions utilized in the method of this invention, and it is intended to include within the scope of the present invention refractory inorganic oxides which have traditionally been utilized in hydrocarbon conversion catalysts, such as: (1) silica or silica gel, clays, and silicates including those synthetically prepared and naturally occurring, which may or may not be acid treated, for example, attapulgus clay, china clay, diatomaceous earth, fuller's earth, kaolin, kieselguhr, etc.; (2) ceramics, porcelain, crushed firebrick, bauxite; (3) synthetic and naturally occurring refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, silcon carbide, boron nitride, etc.; (4) crystalline zeolitic aluminosilicates such as naturally occurring or synthetically prepared mordenite and/or faujasite, either in the hydrogen form or in a form which has been treated with multivalent cations; (5) spinels such as $MgAl_2O_4$, $FeAl_2O_4$, $ZnAl_2O_4$, $MnAl_2O_4$, $CaAl_2O_4$ and other like compounds having the formula $MOAl_2O_3$ where M is a metal having a valence of 2; and (6) combinations of elements from one or more of these groups. The preferred refractory inorganic oxide is alumina. Suitable aluminas are the crystalline aluminas known as the gamma-, eta-, and theta-alumina, with gamma- or eta-alumina giving best results. In addition, in some embodiments the alumina may contain minor proportions of other well-known refractory inorganic oxides such as silica, zirconia, magnesia, etc. The alumina may be any of the various hydrous aluminum oxides or alumina gels such as boehmite, gibbsite, bayerite, and the like. Activated aluminas, such as have been thermally treated at a temperature in excess of about 400° 1 C, with the elimination of at least a portion of the chemcially and/or physically combined water and hydroxyl groups commonly associated therewith, are particularly suitable. The preferred alumina is substantially pure gamma- or etaalumina.

Preferred refractory inorganic oxides have surface area characteristics such that the average pore diameter is about 20 to about 300 Angstroms, the pore volume is about 0.1 to about 3 cc/g and the surface area is about 25 to about 600 m²/g. The refractory inorganic oxide may or may not be activated prior to use by one or more treatments including drying, calcining, steaming, and acid treating. It is preferred that the refractory inorganic oxide be a catalytically active refractory inorganic oxide.

The refractory inorganic oxide can be used advantageously in the method of this invention in any configuration, shape, or size which exposes a catalytically available amount of the metals disposed thereon to the gas to be treated. The choice of configuration, shape, and size of the refractory inorganic oxide depends on the particular circumstances of use of the method of this invention. Generally, in operations in which the catalytic composite is disposed as a fixed bed in an immobile vessel, the refractory inorganic oxide can be conveniently employed in particulate form, as pills, pellets, granules, rings, spheres, etc. Particulate form is especially desirable for large volumes of catalytic composite, and for use in circumstances in which periodic replacement of the catalytic composite may be desired. In circumstances in which less mass is desirable or in which movement or agitation of particles of refractory inorganic oxide may result in attrition, dusting, and resulting loss of disposed metals or undue increase in pressure drop across the particles, a monolithic structure is preferred.

The preferred refractory inorganic oxide, alumina, can be prepared in any suitable manner and may be synthetically prepared or naturally occurring. Whatever type of alumina is employed, it may be activated prior to use by one or more treatments including drying, calcination, steaming, etc., and it may be in a form known as activated alumina, activated alumina of commerce, porous alumina, alumina gel, etc. For example, the alumina may be prepared by adding a suitable alkaline reagent, such as ammonium hydroxide to a salt of aluminum such as aluminum chloride, aluminum nitrate, etc., in an amount to form an aluminum hydroxide gel which upon drying and calcining is converted to alumina. The alumina may be formed in any desired shape such as spheres, pills, cakes, extrudates, powders, granules, etc., and utilized in any desired size. For the purpose of the present invention, one preferred form of alumina is the sphere; and alumina spheres may be continuously manufactured by the well-known oil drop method which comprises: forming an alumina hydrosol by any of the techniques taught in the art and preferably by reacting aluminum metal with hydrochloric acid, combining the resulting hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gell particles are then washed and dried at a relatively low temperature of about 300° F. to about 400° F. and subjected to a calcination procedure at a temperature of about 850° F. to about 1300° F. for a period of about 1 to about 20 hours. It is a good practice to subject the calcined particles to a high temperature treatment with steam in order to remove undesired acidic components such as residual chloride. This procedure effects conversion of the alumina hydrogel to the corresponding crystalline gamma-alumina. See the teachings of U.S. Pat. No. 2,620,314 for additional details.

In general, when using particulate refractory inorganic oxide, best results are expected with a gamma-alumina which is used in the form of spherical particles having: a relatively small diameter (i.e. typically about 1/16 inch), an apparent bulk density of about 0.2 to about 0.6 (most preferably about 0.3) g/cc, a pore volume of about 0.4 cc/g, and a surface area of about 150 to about 250 m$^2$/g.

In automobile exhaust gas applications and in other applications where dimensional or structural stability is particularly desired, a monolithic alumina structure is preferred. In preparing a monolithic structure of the refractory inorganic oxide, it is usually most convenient to employ the refractory inorganic oxide disposed as a thin film on an inert carrier material which provides the structural support for the refractory inorganic oxide. The carrier material can be any refractory material. It is preferred that the carrier material be unreactive with the refractory inorganic oxide and with the gas to which it is exposed. Ceramic materials are a preferred class of carrier material. Examples of suitable ceramic materials include: sillimanite, petalite, cordierite, mullite, zircon, zircon mullite, spodumene, alumina-titinate etc. The carrier material can best be utilized in any rigid, unitary configuration which provides a plurality of pores or channels therethrough extending in the direction of gas flow. It is preferred that the carrier material be in a honeycomb configuration. The carrier material can be used advantageously in either unitary form, or as an arrangement of multiple modules. The carrier material can be oriented such that gas flow is generally in the same direction as the cells or channels of the carrier material, or the gas can flow through the carrier material in a transverse or radial manner. For a more detailed discussion of monolithic structures, refer to U.S. Pat. No. 3,785,998 and U.S. Pat. No. 3,767,453.

The surface area of the carrier material is not critical to the method of this invention. It is preferred that the micropore volume of the carrier material be relatively low, and it is especially preferred that the carrier material have a macropore distribution such that at least about 90% of the pore volume is in pores having a diameter of greater than about 2000° A. The surface area of the monolithic structure, as opposed to the carrier material of which the structure is made, should be maximized consistent with pressure drop limitations in the particular embodiment of the method of this invention selected. It is preferred that the surface area of the monolithic structure be from about 50 to about 1000 square meters per liter of structure, as measured by N$_2$ adsorption, where the volume of the structure is measured by its exterior dimensions. The geometric surface area of the monolithic structure, in term of cell density, should be maximized consistent with pressure drop limitations, and is preferably in the range of from about 200 to about 800 cells per square inch of cross sectional area of the structure.

The refractory inorganic oxide can be deposited on the carrier material by any conventional or convenient means. It is preferred that the refractory inorganic oxide deposit be in the form of a film of from about 0.0003 to about 0.01 inches thick. It is also preferred that the refractory inorganic oxide be present on the carrier material in amounts in the range of from about 800 gms per cubic foot of carrier to about 4500 gms per cubic foot of carrier, where the volume is measured by the exterior dimensions of the carrier material.

The catalytic composite of the method of this invention further comprises the catalytic components: rhodium, uranium, and platinum and/or palladium. The catalytic composite of the method of this invention preferably comprises rhodium, uranium, and platinum.

The catalytic components can be incorporated in the catalytic composite in any suitable manner in or on the refractory inorganic oxide, such as by coprecipitation, cogellation, ion-exchange, or impregnation by soaking, dipping, immersion, or otherwise. The preferred method of preparing the catalyst involves the utilization of a soluble, decomposable compound of the particular catalytic component to impregnate the refractory inorganic oxide in a relatively uniform manner. For example, the platinum and/or palladium component may be added to the refractory inorganic oxide by commingling the latter with an aqueous solution of chloroplatinic and/or chloropalladic acid. The chloroplatinic acid and chloropalladic acid can be in common aqueous solution, or in separate aqueous solutions. In the latter case, in instances in which both a platinum and a palladium component are desired, the commingling of the refractory inorganic oxide with the solutions can be performed sequentially in any order. Other water-soluble compounds or complexes may be employed in impregnation solutions and include ammonium chloroplatinate, bromoplatinic acid, platinum trichloride, platinum tetrachloride hydrate, platinum dichlorocarbonyl dichloride, dinitrodiaminoplatinum, sodium tetranitroplatinate, palladium chloride, palladium nitrate, palladium dioxide, diamminepalladium hydroxide, and tetramminepalladium chloride. Likewise, the rhodium component may be added to the refractory inorganic oxide by commingling the latter with an aqueous solution of rhodium trichloride. Other water-soluble compounds or complexes of rhodium may be employed, such as hexamminerhodium chloride, rhodium carbonylchloride, rhodium trichloride hydrate, rhodium nitrate, sodium hexachlororhodate, and sodium hexanitrorhodate.

The utilization of a platinum, rhodium, or palladium chloride compound, such as chloroplatinic or chloropalladic acid or rhodium trichloride hydrate, is ordinarily preferred. Hydrogen chloride, nitric acid, or the like acid can be added to the solution in order to further facilitate the uniform distribution of the metallic components throughout the refractory inorganic oxide. In addition, it is generally preferred to dispose the catalytic components on the refractory inorganic oxide after it has been calcined in order to minimize the risk of washing away the valuable metal compounds; however, in some cases it may be advantageous to dispose the catalytic components on the refractory inorganic oxide when it is in a gelled state.

The uranium component of the catalytic composite can be disposed on the refractory inorganic oxide from a common solution with the rhodium and the platinum and/or palladium components, or the uranium component can be disposed on the refractory inorganic oxide prior to or subsequent to said rhodium and platinum and/or palladium components. It is a preferred practice to initially impregnate the carrier material with the uranium component, for example from an aqueous uranyl nitrate solution, the uranium-impregnated carrier material being oxidized, preferably in air, at a temperature of from about 370° C. to about 650° C. prior to impregnation with the rhodium and platinum and/or palladium components.

The catalytic composite of this invention is suitable for use in a converter or a reactor of through-flow, cross-flow, or radial-flow design installed in the exhaust line of an internal combustion engine. The converter or reactor may be employed in series with a subsequent oxidation converter or reactor with combustion air being injected ahead of the oxidation converter to insure conversion of the residual carbon monoxide and hydrocarbons remaining in the exhaust gases.

The following examples are comparative examples illustrating the improvement in carbon monoxide, hydrocarbon and nitrogen oxide conversion to be derived through practice of the present invention. The examples are not intended as an undue limitation on the generally broad scope of the invention as set out in the appended claims.

EXAMPLE 1

To illustrate the increased activity of a platinum-rhodium-uranium catalyst over a platinum-rhodium catalyst, samples of each were prepared.

A catalytic composite comprising a high surface area alumina-coated ceramic honeycomb cylinder impregnated with 250 gms. of uranium, 38 gms. of platinum and 2 gms. of rhodium per cubic foot was prepared. The alumina-coated-ceramic honeycomb cylinder was $\frac{7}{8}$" in diameter, $3\frac{1}{8}$" in length and contained approximately 236 parallel triangular channels per square inch. The alumina-coated ceramic honeycomb cylinder had approximately 2100 gm. of gamma-alumina per cubic foot. In the preparation of the catalytic composite, the alumina-coated ceramic honeycomb cylinder was loaded into a vacuum flask and the flask was evacuated to about 28" Hg. A 36 ml. aqueous uranyl nitrate hydrate solution (1.1 gms. of uranium) was admitted to the evacuated flask and swirled in contact with the cylinder for about 240 seconds. The resulting uranium-impregnated honeycomb cylinder was recovered from the flask, dried at 100°–300° C., and calcined in air for 2 hours at 530° C. The cylinder was then reloaded into the vacuum flask and the flask was again evacuated. A 36 ml. common aqueous solution of chloroplatinic acid (0.11 gm. of platinum) and rhodium trichloride hydrate (0.0038 gm. of rhodium) was then admitted to the flask and swirled in contact with the uranium-impregnated cylinder for about 240 seconds. The resulting impregnated cylinder was recovered from the flask, dried at 100°–300° C. and calcined in air at 530° C. for 2 hours. The calcined cylinder was thereafter cut into discs $\frac{1}{2}$" in length.

A platinum-rhodium catalyst was then prepared in substantially the same manner as described above, but without the uranium constituent. A catalytic composite comprising a high surface area alumina-coated ceramic honeycomb cylinder impregnated with 38 gms. of platinum and 2 gms. of rhodium per cubic foot was prepared. The alumina-coated ceramic honeycomb cylinder was $\frac{7}{8}$" in diameter, $3\frac{1}{8}$" in length and contained approximately 236 parallel triangular channels per square inch. In the preparation of the catalytic composite, the alumina-coated ceramic honeycomb cylinder was loaded into a vacuum flask and the flask was evacuated to about 28" Hg. A 36 ml. common aqueous solution of chloroplatinic acid (0.11 gm. of Pt) and rhodium trichloride hydrate (0.0038 gm. of rhodium) was admitted to the flask and swirled in contact with the cylinder for about 240 seconds. The resulting impregnated cylinder was recovered from the flask, dried at 100°–300° C. and calcined in air at 530° C. for 2 hours. The calcined cylinder was thereafter cut into discs $\frac{1}{2}$" in length.

EXAMPLE II

The two catalytic composites prepared in the above example were then tested for carbon monoxide, hydrocarbon and nitric oxide conversion activity. The catalysts were evaluated with respect to a synthetic exhaust gas mixture affording net oxidizing conditions typically encountered under feedback control, and with respect to a synthetic exhaust gas mixture affording net reducing conditions typically encountered under feedback control. The composition of the synthetic exhaust gas mixtures expressed in mole percent was as follows:

|          | Net Oxidizing | Net Reducing |
|----------|---------------|--------------|
| $O_2$    | 0.97%         | 0.32%        |
| CO       | 0.45          | 1.35         |
| $H_2$    | 0.15          | 0.45         |
| $C_3H_8$ | 0.015         | 0.044        |
| NO       | 0.11          | 0.11         |
| $N_2$    | 76.67         | 76.09        |
| $CO_2$   | 11.64         | 11.64        |
| $SO_2$   | 0             | 0            |
| $H_2O$   | 10.00         | 10.00        |

(The sums of the constituents are not exactly 100% because of rounding errors.)

The synthetic gas mixtures were alternately charged in contact with the catalytic composite, said gaseous mixtures alternating or cycling between net oxidizing and net reducing conditions at a frequency of 0.25 hertz. The synthetic exhaust gas mixtures were preheated to 500° C. and charged in contact with the catalytic composite at a GHSV of 119,000.

Each of the catalytic composites were further evaluated in the same manner except that the gases were preheated to only 350° C. to provide a more demanding measure of catalytic conversion. In each case, the effluent exhaust gases were sampled and analyzed after a 15-minute test period with the following results:

|          | % Conversion at 500° C. | | | % Conversion at 350° C. | | |
|----------|----------|----|----|----------|----|----|
| Catalyst | $C_3H_8$ | CO | NO | $C_3H_8$ | CO | NO |
| Pt—Rh—U  | 89       | 90 | 46 | 41       | 94 | 46 |
| Pt—Rh    | 87       | 84 | 32 | 30       | 77 | 41 |

It can be seen that the platinum-rhodium-uranium catalyst is superior in all respects, in both the high temperature and low temperature environments, to the platinum-rhodium catalyst. This example shows that uranium is a substantial activator of a platinum-rhodium catalyst.

EXAMPLE III

The two catalytic composites prepared in Example I were tested for carbon monoxide, hydrocarbon, and nitric oxide conversion activity, in a manner similar to that set forth in Example II. In this example, however, the synthetic exhaust gas mixtures contained 45 ppm sulfur as $SO_2$ on a wet basis (50 ppm sulfur as $SO_2$ dry basis). The purpose of the presence of sulfur was to more closely approximate actual automotive operating conditions. Sulfur dioxide is well-known as a poison for automobile exhaust catalysts, and its presence thus subjects catalysts to more severe tests of effectiveness. The catalysts were evaluated with respect to a synthetic exhaust gas mixture affording net oxidizing conditions typically encountered under feedback control, and with respect to a synthetic exhaust gas mixture affording net reducing conditions typically encountered under feedback control. The composition of the synthetic exhaust gas mixtures expressed in mole percent was as follows:

|  | Net Oxidizing | Net Reducing |
|---|---|---|
| $O_2$ | 0.97% | 0.32% |
| CO | 0.45 | 1.35 |
| $H_2$ | 0.15 | 0.45 |
| $C_3H_8$ | 0.015 | 0.044 |
| NO | 0.11 | 0.11 |
| $N_2$ | 76.66 | 76.08 |
| $CO_2$ | 11.64 | 11.64 |
| $SO_2$ | 0.0045 | 0.0045 |
| $H_2O$ | 10.00 | 10.00 |

(The sums of the constituents are not exactly 100% because of rounding errors.)

The synthetic gas mixtures were alternately charged in contact with the catalytic composite, said gaseous mixtures alternating or cycling between net oxidizing and net reducing conditions at a frequency of 0.25 hertz. The synthetic exhaust gas mixtures were preheated to 500° C. and charged in contact with the catalytic composite at a GHSV of 119,000.

Each of the catalytic composites were further evaluated in the same manner except that the gases were preheated to only 350° C. to provide a more demanding measure of catalytic conversion. In each case, the effluent exhaust gases were sampled and analyzed after a 15-minute test period with the following results:

| Catalyst | % Conversion at 500° C. | | | % Conversion at 350° C. | | |
|---|---|---|---|---|---|---|
|  | $C_3H_8$ | CO | NO | $C_3H_8$ | CO | NO |
| Pt—RH—U | 84 | 94 | 55 | 51 | 92 | 49 |
| Pt—Rh | 81 | 81 | 37 | 31 | 74 | 33 |

Again, as in Example II, it is seen that the platinum-rhodium-uranium catalyst is superior in all respects, in both the high temperature and low temperature environments, to the platinum-rhodium catalyst. In fact, as the comparisons indicate, the advantage of the platinum-rhodium-uranium catalyst is substantially increased in the high sulfur compound operation of this Example III. These results show that the presence of sulfur compounds in the gas influence to a much less extent the ability of a platium-rhodium-uranium catalyst to catalyze the desired reactions.

EXAMPLE IV

In this example, the performance of a platinum-rhodium-uranium catalyst was compared to the performance of a platinum-rhodium-nickel catalyst and a platinum-rhodium-cerium catalyst. The latter two catalysts were prepared as follows:

A catalytic composite comprising a high surface area alumina-coated ceramic honeycomb cylinder impregnated with 250 gms. of nickel, 37 gms. of platinum and 3.7 gms. of rhodium per cubic foot was prepared. The alumina-coated ceramic honeycomb cylinder was ⅞" in diameter, 3⅛" in length and contained approximately 236 parallel triangular channels per square inch, as in Example I. In the preparation of the catalytic composite, the alumina-coated ceramic honeycomb cylinder was loaded into a vacuum flask and the flask was evacuated to about 28" Hg. A 36 ml. aqueous nickel nitrate hydrate solution (1.9 gms. of nickel) was admitted to the evacuated flask and swirled in contact with the cylinder for about 240 seconds. The resulting nickel-impregnated honeycomb cylinder was recovered from the flask, dried at 100°-300° C., and calcined in air for 2 hours at 530° C. The cylinder was then reloaded into the vacuum flask and the flask was again evacuated. A 36 ml. common aqueous solution of chloroplatinic acid (0.11 gm. of platinum) and rhodium trichloride hydrate (0.0038 gm. of rhodium) was then admitted to the flask and swirled in contact with the uranium-impregnated cylinder for about 240 seconds. The resulting impregnated cylinder was recovered from the flask, dried at 100°-300° C. and calcined in air at 530° C. for 2 hours. The calcined cylinder was thereafter cut into discs ½" in length.

A second catalytic composite comprising a high surface area alumina-coated ceramic honeycomb cylinder impregnated with 140 gms. of cerium, 38 gms. of platinum and 2 gms. of rhodium per cubic foot was prepared. The alumina-coated ceramic honeycomb cylinder was ⅞" in diameter, 3⅛" in length and contained approximately 236 parallel triangular channels per square inch. In the preparation of the catalytic composite, the alumina-coated ceramic honeycomb cylinder was loaded into a vacuum flask and the flask was evacuated to about 28" Hg. A 36 ml. aqueous cerium nitrate hydrate solution (1.0 gm. of uranium) was admitted to the evacuated flask and swirled in contact with the cylinder for about 240 seconds. The resulting cerium-impregnated honeycomb cylinder was recovered from the flask, dried at 100°-300° C., and calcined in air for 2 hours at 530° C. The cylinder was then reloaded into the vacuum flask and the flask was again evacuated. A 36 ml. common aqueous solution of chloroplatinic acid (0.11 gm. of platinum) and rhodium trichloride hydrate (0.0038 gm. of rhodium) was then admitted to the flask and swirled in contact with the uranium impregnated cylinder for about 240 seconds. The resulting impregnated cylinder was recovered from the flask, dried at 100°-300° C. and calcined in air at 530° C. for 2 hours. The calcined cylinder was thereafter cut into discs ½" in length.

The two catalytic composites prepared in this example were then tested for carbon monoxide, hydrocarbon and nitric oxide conversion activity. The catalysts were evaluated with respect to a synthetic exhaust gas mixture affording net oxidizing conditions typically encountered under feedback control, and with respect to a synthetic exhaust gas mixture affording net reducing conditions typically encountered under feedback control. The compositions of the synthetic exhaust gas mixtures are set forth in Example II. The synthetic gas mixtures were alternately charged in contact with the catalytic composite, said gaseous mixtures alternating or cycling between net oxidizing and net reducing conditions at a frequency of 0.25 hertz. The synthetic exhaust gas mixtures were preheated to 500° C. and charged in contact with the catalytic composite at a GHSV of 119,000.

Each of the catalytic composites were further evaluated in the same manner except that the gases were preheated to only 350° C. to provide a more demanding measure of catalytic conversion. In each case, the effluent exhaust gases were sampled and analyzed after a 15-minute test period with the following results, tabulated for comparative purposes with the results of Example II for the catalyst comprising platinum, rhodium, and uranium.

| Catalyst | % Conversion at 500° C. | | | % Conversion at 350° C. | | |
|---|---|---|---|---|---|---|
| | C<sub>3</sub>H<sub>8</sub> | CO | NO | C<sub>3</sub>H<sub>8</sub> | CO | NO |
| Pt—Rh—U | 89 | 90 | 46 | 41 | 94 | 46 |
| Pt—Rh—Ni | 80 | 87 | 40 | 23 | 81 | 43 |
| Pt—Rh—Ce | 91 | 94 | 45 | 42 | 91 | 51 |

The data shows that the catalyst comprising platinum, rhodium, and uranium is distinctly superior to the nickel-containing catalyst which has heretofore been the preferred catalyst for three-component control of automotive exhaust gases. Furthermore, the platinum-rhodium and uranium catalyst compares favorably to the platinum-rhodium-cerium catalyst.

EXAMPLE V

The two catalysts prepared in Example IV were also tested in a more severe environment than that provided in Example IV. In this example, the synthetic exhaust gas mixture contained 45 ppm sulfur as $SO_2$ on a wet basis (50 ppm sulfur as $SO_2$ on a dry basis). Since sulfur compounds are well-known as deactivators of automotive exhaust catalysts, its presence in the synthetic gas subjects catalysts to more severe tests of effectiveness. Further, since sulfur compounds are invariably present in automotive exhaust gases, this example most closely represents actual automotive operating conditions. The tests of this example were conducted in the same manner as the tests of Example III. The catalysts were evaluated with respect to a synthetic exhaust gas mixture affording net oxidizing conditions typically encountered under feedback control, and with respect to a synthetic exhaust gas mixture affording net reducing conditions typically encountered under feedback control, the analyses of which are set forth in Example III. The synthetic gas mixtures were alternately charged in contact with the catalytic composite, said gaseous mixtures alternating or cycling between net oxidizing and net reducing conditions at a frequency of 0.25 hertz. The synthetic exhaust gas mixtures were preheated to 500° C. and charged in contact with the catalytic composite at a GHSV of 119,000.

Each of the catalytic composites were further evaluated in the same manner except that the gases were preheated to only 350° C. to provide a more demanding measure of catalytic conversion. In each case, the effluent exhaust gases were sampled and analyzed after a 15-minute test period with the following results, tabulated for comparative purposes with the results of Example III for the catalyst comprising platinum, rhodium, and uranium:

| Catalyst | % Conversion at 500° C. | | | % Conversion at 350° C. | | |
|---|---|---|---|---|---|---|
| | C<sub>3</sub>H<sub>8</sub> | CO | NO | C<sub>3</sub>H<sub>8</sub> | CO | NO |
| Pt—Rh—U | 84 | 94 | 55 | 51 | 92 | 49 |
| Pt—Rh—Ni | 80 | 82 | 57 | 33 | 77 | 63 |
| Pt—Rh—Ce | 82 | 87 | 42 | 41 | 86 | 51 |

The results of this example clearly show the superiority of the method of this invention. The method of this invention utilizes the surprising ability of uranium to very significantly activate a catalyst comprising platinum and rhodium. The data shows that the method of this invention is very effective in treating gases containing no sulfur compounds and gases containing a high level of sulfur compounds.

I claim as my invention:

1. A process for the oxidation of carbon monoxide, the oxidation of hydrocarbons, and the reduction of oxides of nitrogen contained in a sulfur-dioxide containing gas from an internal combustion engine which comprises contacting said gas at a temperature above 200° C. with a catalytic composite comprising rhodium, uranium, and one or more metals selected from the group consisting of platinum and palladium, dispersed on a high surface area refractory inorganic oxide.

2. The process of claim 1 wherein said sulfur-dioxide containing gas is a net reducing gas.

3. The process of claim 1 wherein said sulfur-dioxide containing gas is a net oxidizing gas.

4. The process of claim 1 wherein said sulfur-dioxide containing gas is intermittently a net reducing gas and a net oxidizing gas.

5. The process of claim 1 wherein said high surface area refractory inorganic oxide is a high surface area alumina.

6. The process of claim 1 wherein said refractory inorganic oxide is a high surface area alumina deposited as a film on a relatively low surface area honeycomb-type ceramic support.

7. The process of claim 1 wherein said catalytic composite comprises from about 0.001 wt.% to about 0.5 wt.% rhodium, from about 0.02 wt.% to about 2.0 wt.% platinum and from about 0.01 wt.% to about 10 wt.% uranium dispersed on a high surface area alumina.

8. The process of claim 1 wherein said catalytic composite comprises from about 0.005 wt.% to about 0.15 wt.% rhodium, from about 0.1 wt.% to about 0.6 wt.% platinum and from about 0.05 wt.% to about 3.0 wt.% uranium dispersed on a high surface area alumina deposited as a film on a relatively low surface area honeycomb-type ceramic support.

* * * * *